(12) United States Patent
Zhu et al.

(10) Patent No.: US 7,631,144 B1
(45) Date of Patent: Dec. 8, 2009

(54) WRITE LATENCY EFFICIENT STORAGE SYSTEM

(75) Inventors: Ming Benjamin Zhu, Palo Alto, CA (US); R. Hugo Patterson, Mountain View, CA (US); Allan J. Bricker, Sunnyvale, CA (US); Edward K. Lee, Mountain View, CA (US)

(73) Assignee: DataDomain, Inc., Santa Clara, CA (US)

( * ) Notice: Subject to any disclaimer, the term of this patent is extended or adjusted under 35 U.S.C. 154(b) by 125 days.

(21) Appl. No.: 10/940,408

(22) Filed: Sep. 13, 2004

(51) Int. Cl.
*G06F 12/00* (2006.01)

(52) U.S. Cl. ...................................... 711/118; 711/162

(58) Field of Classification Search ................. 711/118, 711/162
See application file for complete search history.

(56) References Cited

U.S. PATENT DOCUMENTS

| | | | | |
|---|---|---|---|---|
| 4,437,155 A * | 3/1984 | Sawyer et al. | ................ | 711/136 |
| 5,745,608 A * | 4/1998 | Rust | ........................... | 382/247 |
| 5,765,173 A * | 6/1998 | Cane et al. | .................. | 707/204 |
| 6,032,232 A * | 2/2000 | Lindeborg et al. | ........... | 711/149 |
| 6,243,788 B1 * | 6/2001 | Franke et al. | .................. | 711/3 |
| 6,765,860 B2 * | 7/2004 | Tobita et al. | ............. | 369/275.4 |
| 2006/0026342 A1 * | 2/2006 | Calvignac et al. | ........... | 711/105 |

FOREIGN PATENT DOCUMENTS

JP 2003-337741 * 11/2003

OTHER PUBLICATIONS

Venti: a new approach to archival storage. Proceeding of the FAST 2002 Conference on File and Storage Technologies, USENIX Association; Monterrey, California USA, Jan. 28-30.*

* cited by examiner

*Primary Examiner*—Reginald G Bragdon
*Assistant Examiner*—Aracelis Ruiz
(74) *Attorney, Agent, or Firm*—Van Pelt, Yi & James LLP

(57) ABSTRACT

A method for storing data is disclosed. The method comprises receiving a data stream comprising a plurality of data segments and preliminarily checking in a memory having a relatively low latency whether one of the plurality of data segments has been stored previously. The method further comprises in the event that the preliminary check does not conclusively determine whether the data segment has been stored previously, limiting checking in a memory having a relatively high latency to conclusively determine whether the data segment has been previously stored, and in the event that checking is limited or in the event that the check in the memory having relatively high latency conclusively determines the data segment has not been previously stored, storing the data segment.

39 Claims, 6 Drawing Sheets

WRITE LATENCY EFFICIENT STORAGE SYSTEM

FIELD OF THE INVENTION

The present invention relates generally to data storage systems. More specifically, a write latency, high-throughput data storage system is disclosed.

BACKGROUND OF THE INVENTION

An efficient way to build data storage system is to store unique data segments. This method can reduce the required storage space substantially, especially for data that has a high degree redundancy. To improve the write throughput of such a storage system, the challenge is to check whether a data segment is redundant and write the non-redundant ones quickly.

FIG. 1 is a block diagram illustrating a typical storage system. Data are generated from a variety of sources, for instance data sources 100, 102 and 104. The data sources stream their data contents to storage system 106. The storage system receives the data streams, optionally processes the data streams and stores the data to storage devices such as hard drive. The storage system can consist of a single unit that includes processors and storage devices or multiple units in which processors and storage devices are connected via a network.

When moving data such as backup data from the data sources to the data storage. Commonly, there is a substantial amount of data from each of the data sources that remains the same between two consecutive backups, and sometimes there are several copies of the same data. To improve efficiency, storage systems check whether portions of the data, or segments, have been previously stored.

To check whether the segments have been stored previously, storage systems produce segment ID's for the segments. Checks are performed on the data segments or segment ID's to determine whether the same segments have previously been stored to a segment database of the system. Preliminary checking techniques are used to lower the latency associated with the checking and increase search efficiency. For example, information about segments or segment ID's that are likely to be encountered soon is stored in a cache and can be used in a preliminary check. Also, a data derived summary can be used in the preliminary check. If the low latency checks are inconclusive, a high latency check is performed by searching all the previously stored segments or segment ID's for a match.

While this approach achieve some efficiency gains by not copying the same data twice, it still incurs significant latency when the preliminary checks are inconclusive and a high latency check is employed to guarantee that the data have not been previously stored. It would be desirable to have a storage system that could still further reduce latency.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A write latency efficient storage system is disclosed. Write latency efficiency is achieved by limiting high latency searching. In some embodiments, the limiting is achieved by only allowing high latency searching on a deterministic subset of data segments, or qualified segments. In some embodiments, the limiting is achieved by rate limiting access to the high latency device. In some embodiments, limiting is achieved by only allowing high latency searching on a deterministic subset of data segments, or qualified segments and by rate limiting access to the high latency device.

This system is an example of optimization where the efficiency of storage (compression of data) is balanced against efficiency of performance (latency of writing the stored data). The system allows an inefficiency in compression of data by allowing some duplicate copies of data to be stored to achieve higher performance (e.g. writing throughput or reading speed). However, not all duplicate are stored so that the efficiency of storage is not lost. Allowing this ability to trade off these efficiencies provides for a system that can better serve its user based on their storage and performance requirements. In some embodiments, by determining data compression and performance requirements, a data storage duplicate allowance can be determined.

Figure 1:
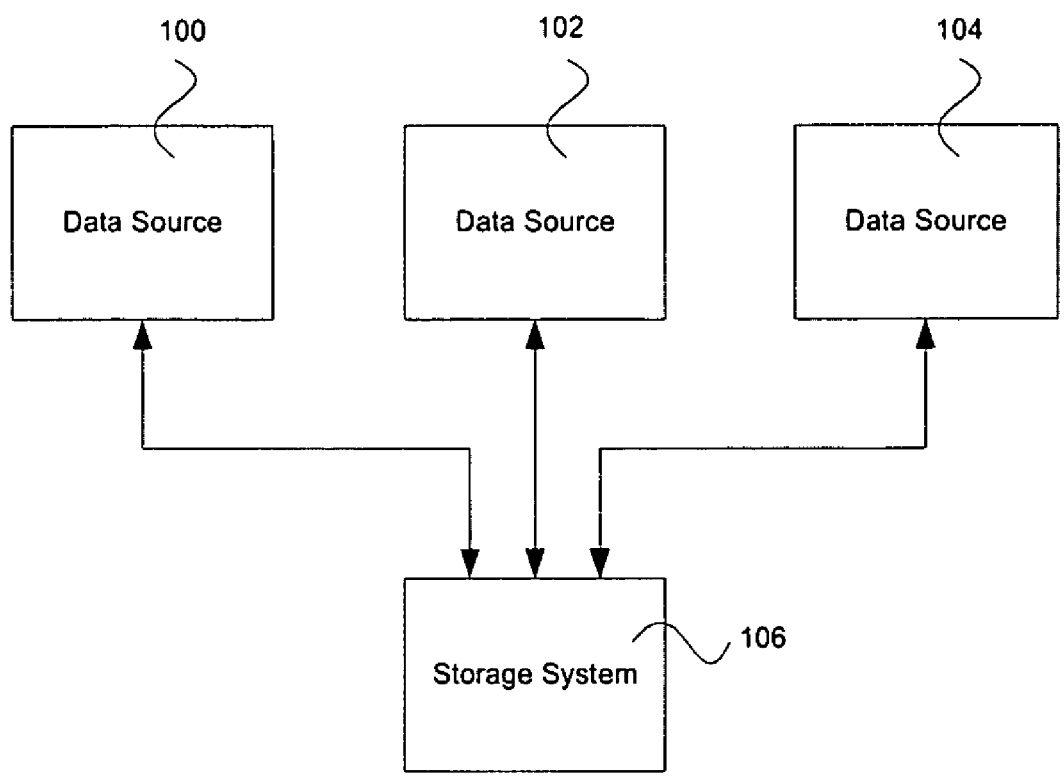
FIG. 1 is a block diagram illustrating a typical network data storage system.
Figure 2:
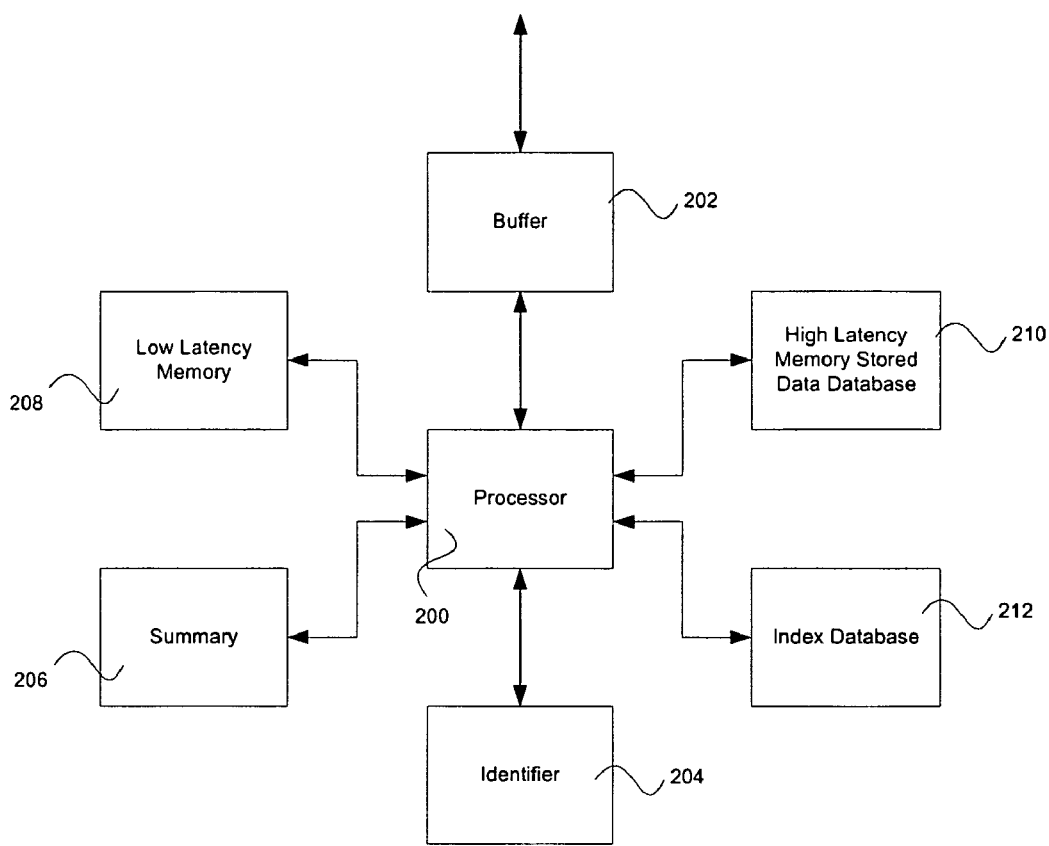
FIG. 2 illustrates a storage system.

FIG. 2 illustrates a data storage system. Data sources stream data into buffer 202. Processor 200 divides input data into segments. The data may be separated into segments such that the segments can be readily matched with segments from previous or future streams according to the techniques disclosed in Finding Similar Files in A Large File System (Udi Manber, Technical Report TR 93-33, University of Arizona, October 1993). A data segment is then associated with an identifier, or segment ID. Techniques for creating identifiers are described in U.S. patent application Ser. No. 10/611,309 (Filing Date: Jun. 30, 2003) by Patterson entitled: "DATA STORAGE USING IDENTIFIERS" which is incorporated by reference for all purposes. Processor 200 checks low latency memory 208 to see if the data segment has been previously stored. Low latency memory 208 contains the most likely data to match the incoming data. In some embodiments, the most likely data is recent data accessed in the high latency memory and the data closely related to it. In some embodiments, the data segment is compared to data segments in the low latency memory. In some embodiments, the data segment ID is compared to data segment ID's in the low latency memory. In some embodiments, the low latency memory is a cache. In some embodiments, the low latency memory is semiconductor memory.

In some embodiments, if a data segment or data segment ID is qualified, then a check by summary 206 can identify if the data is new using a summary. By reducing the number of data segments in the summary through qualification, the memory requirements for the summary data structure can be reduced. This reduction in memory requirements enables easy scaling of the storage system to larger sizes. In some embodiments, qualified is a determined using a deterministic function of the data segment or the data segment ID to only select a subset of the data segments for checking with a summary. In some embodiments, qualified can be determined by requiring that a number of bits in the data segment, or data segment ID, are equal to a value. For example, a data segment is qualified if the last two bits in the data segment are equal to 0. In some embodiments, qualified can be determined by requiring that a hash ID of the data segment be equal to a value.

Summary techniques are described in U.S. patent application Ser. No. 10/325,690 (Filing Date: Dec. 20, 2002) by Zhu, et al entitled: "EFFICIENT DATA STORAGE SYSTEM" which is incorporated by reference for all purposes; and also in U.S. patent application Ser. No. 10/325,479 (Filing Date: Dec. 20, 2002) by Zhu, et al entitled "EFFICIENT DATA STORAGE SYSTEM" which is incorporated by reference for all purposes. Summary techniques identify if the data segment is new, but cannot indicate with certainty that the data segment has been previously stored.

In some embodiments, the number of high latency memory 210 accesses is rate limited in order to reduce the latency of searching on the disc. Rate limiting can be achieved by counting the number of segments or bytes per file or per system that have been checked by accessing the high latency memory. In some embodiments, the high latency memory 210 is a hard disk. In some embodiments, the high latency memory 210 is a tape drive. In some embodiments, the high latency memory 210 is an optical drive.

Index database 212 links stored data database location with segment Ids. This allows for efficient retrieval of segments from the stored data database. The index database also links the segment ID's to the files the segments came from on the system being backed up.

Figure 3:
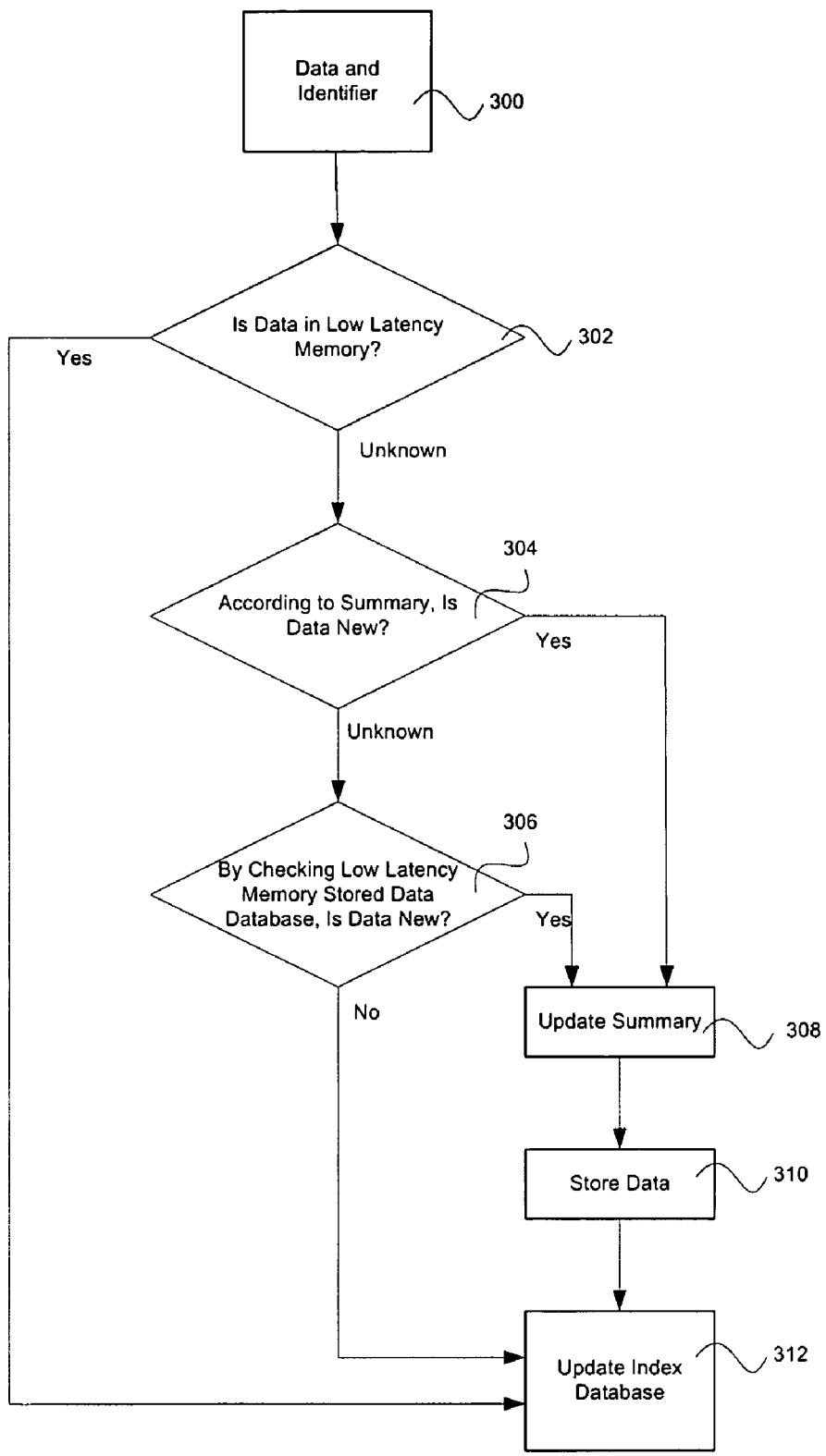
FIG. 3 illustrates a write process with no write latency efficiency methods.

FIG. 3 illustrates a write process with no write latency efficiency methods. In 300, a data segment and its corresponding data segment ID is input to the process. In 302, the data segment is compared to the data segments in the low latency memory to see if the data segment has been previously stored. In some embodiments, the data segment ID is compared to data segment ID's in the low latency memory to see if the data segment has been previously stored. If it is determined that the data has been previously stored, control is transferred to 310, where the index database is updated. If it is not determined that the data segment has been previously stored, control is transferred to 304. In 304, a summary is checked to determine if the data segment is new. If it is determined that the data segment is new, the summary is updated in 308, the data is stored in the stored data database in 310, and the index database is updated in 312. If it is not determined that the data segment is new, then in 306 the data segment is compared to the data segments in the high latency memory data stored database in order to determine if the data segment has been previously stored. In some embodiments, in 306 the data segment ID is compared to the data segment ID's in the high latency memory data stored database in order to determine if the data segment has been previously stored. If it is determined that data segment has not been previously stored, then the data segment is new and the summary is updated in 308, the data is stored in the stored data database in 310, and the index database is updated in 312. If the data segment is determined to have been previously stored, then the index database is updated in 312.

Figure 4:
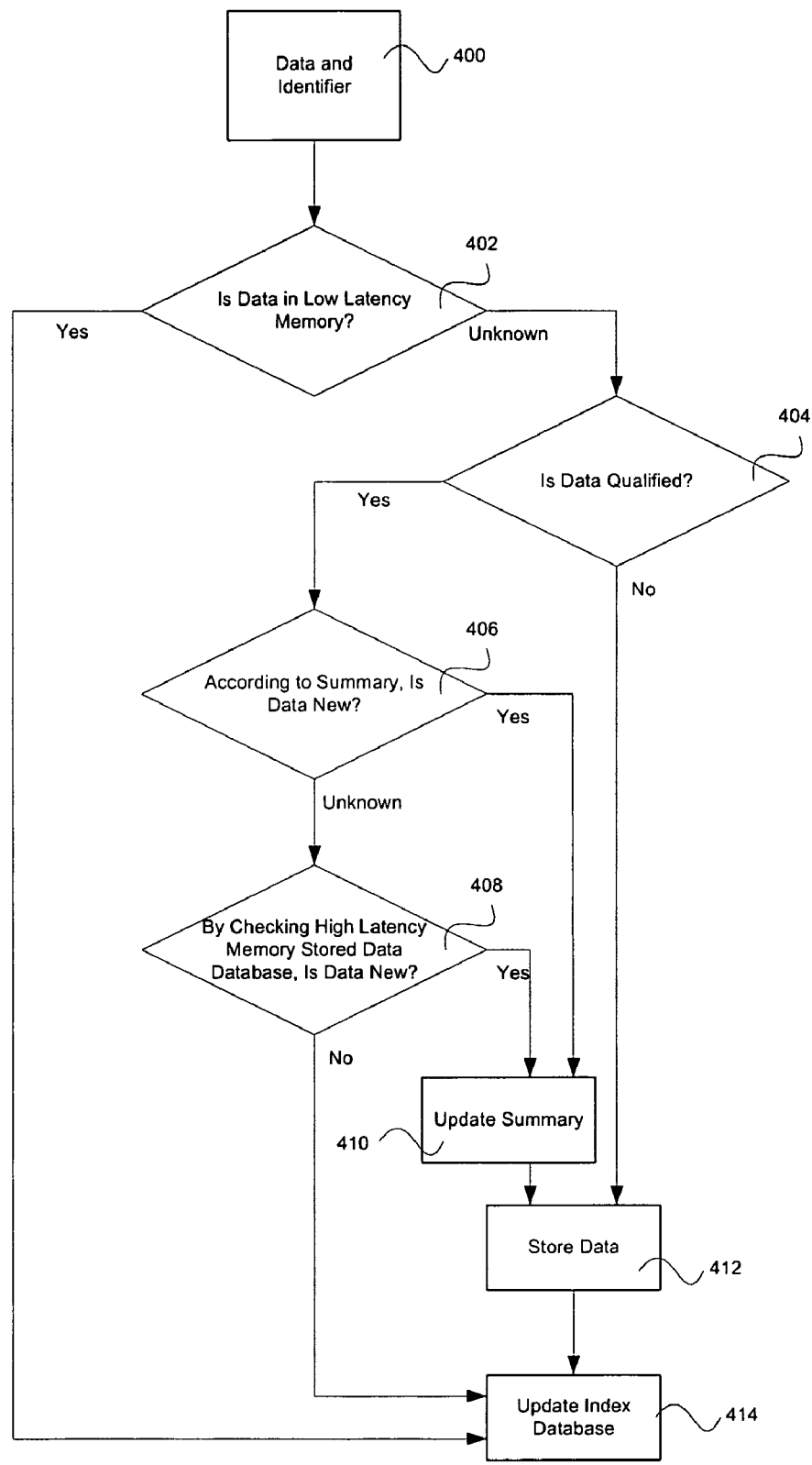
FIG. 4 illustrates a write process with a write latency efficiency method.

FIG. 4 illustrates a write process with a write latency efficiency method. In 400, a data segment and its corresponding data segment ID is input to the process. In 402, the data segment is compared to the data segments in the low latency memory to see if the data segment has been previously stored. In some embodiments, the data segment ID is compared to data segment ID's in the low latency memory to see if the data segment has been previously stored. If it is determined that the data has been previously stored, control is transferred to 414, where the index database is updated. If it is not determined that the data segment has been previously stored, control is transferred to 404. In 404, it is determined if the data segment is qualified. The qualification function is a deterministic function based on the data segment. The qualification function is designed to only qualify a subset of all data segments. For example, a simple qualification function example is that certain bits in the data segment equal a specific value (e.g. the last 8 bits in the data segment must all equal 0). In some embodiments, the qualification function can be a hash function. In some embodiments, in 404 it is determined if the data segment ID instead of the data segment is qualified. If the data segment is not qualified, then the data segment is stored in the high latency stored data database in 412 and the index database is updated in 414. This path where data is not qualified, reduces the number of checks to the high latency memory which increases write efficiency. In addition, because the summary only covers qualified data, the summary memory requirements are reduced allowing scaling up the data storage system. If the data segment is qualified, then in 406, a summary is checked to determine if the data segment is new. If it is determined that the data segment is new, the summary is updated in 410, the data is stored in the stored data database in 412, and the index database is updated in 414. If it is not determined that the data segment is new, then in 408 the data segment is compared to the data segments in the high latency memory data stored database in order to determine if the data segment has been previously stored. In some embodiments, in 408 the data segment ID is compared to the data segment ID's in the high latency memory data stored database in order to determine if the data segment has been previously stored. If it is determined that data segment has not been previously stored, then the data segment is new and the summary is updated in 410, the data is stored in the stored data database in 412, and the index database is updated in 414. If the data segment is determined to have been previously stored, then the index database is updated in 414.

Figure 5:
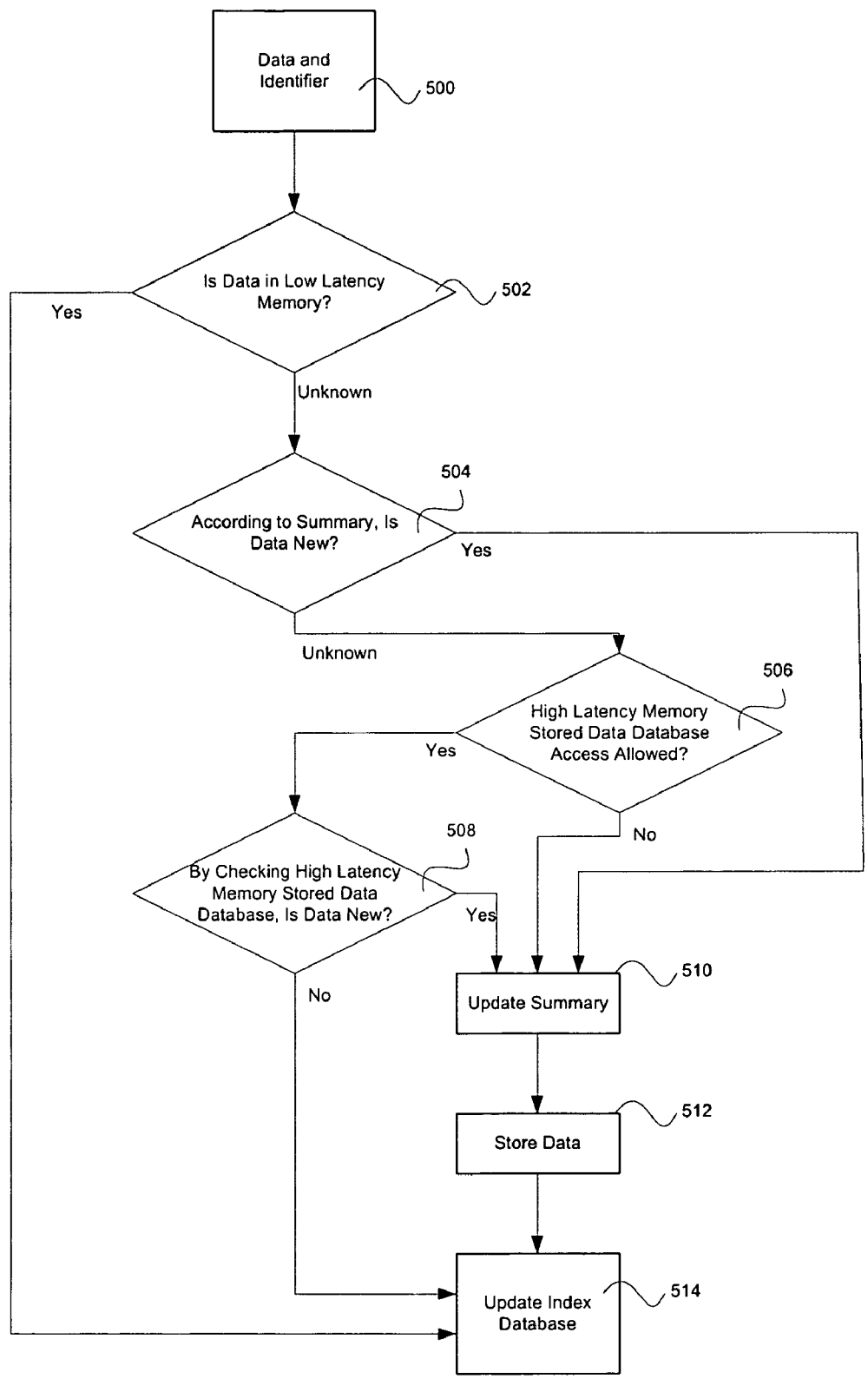
FIG. 5 also illustrates a write process with a write latency efficiency method.

FIG. 5 also illustrates a write process with a write latency efficiency method. In 500, a data segment and its corresponding data segment ID is input to the process. In 502, the data segment is compared to the data segments in the low latency memory to see if the data segment has been previously stored. In some embodiments, the data segment ID is compared to data segment ID's in the low latency memory to see if the data segment has been previously stored. If it is determined that the data has been previously stored, control is transferred to 514, where the index database is updated. If it is not determined that the data segment has been previously stored, control is transferred to 504. In 504, a summary is checked to determine if the data segment is new. If it is determined that the data segment is new, the summary is updated in 510, the data is stored in the stored data database in 512, and the index database is updated in 514. If it is not determined that the data segment is new, then in 506 it is determined if access is allowed to the high latency memory stored data database. Restricting access reduces the number of checks to the high latency memory which increases write efficiency. In some embodiments, access is allowed if a count of accesses to the higher latency memory is below a threshold for a given file or a given system. In some embodiments, access is allowed if a count of segments that have required accesses to the high latency memory is below a threshold for a given file or system. In some embodiments, access is allowed if a count of bytes that have required accesses to the high latency memory is below a threshold for a given file or a given system. If access is not allowed, then the summary is updated in 510, the data is stored in the stored data database in 512, and the index database is updated in 514. If access is allowed, then in 508 the data segment is compared to the data segments in the high latency memory data stored database in order to determine if the data segment has been previously stored. In some embodiments, in 508 the data segment ID is compared to the data segment ID's in the high latency memory data stored database in order to determine if the data segment has been previously stored. If it is determined that data segment has not been previously stored, then the data segment is new and the summary is updated in 510, the data is stored in the stored data database in 512, and the index database is updated in 514. If the data segment is determined to have been previously stored, then the index database is updated in 514.

Figure 6:
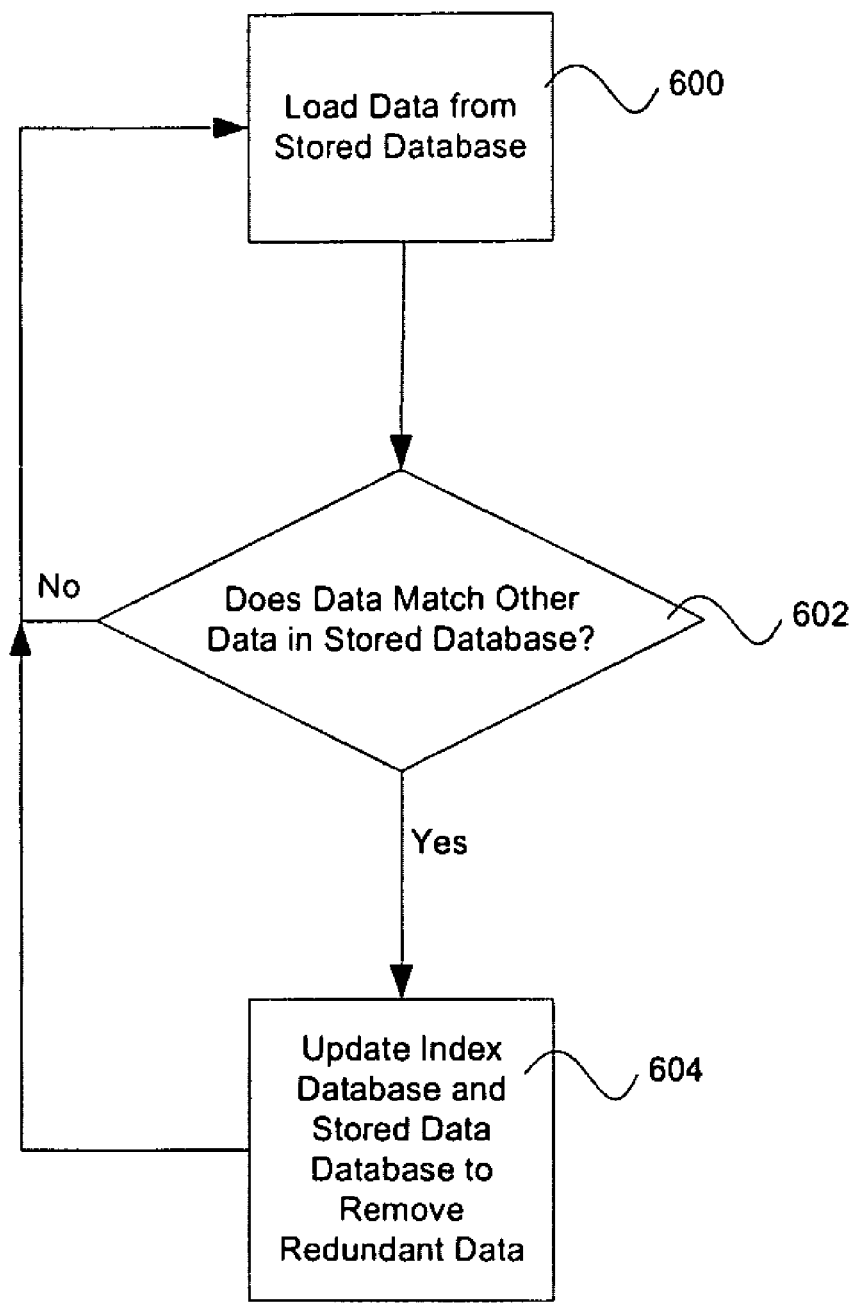
FIG. 6 illustrates a process for removal of redundant data in stored data database.

FIG. 6 illustrates a process for removal of redundant data in stored data database. In 600, data is loaded from stored data database. In 602, it is determined if the data stored is stored data database matches loaded data. In some embodiments, loaded data is compared to all other entries in stored data database. In some embodiments, loaded segment data ID is compared to all other segment data ID's in stored data database. If it is determined that there are no data matching the loaded data in the stored data database, then control is return to 600 where the next piece of data is loaded for comparison. If it is determined that there are data matching the loaded data in the stored data database, then in 604 the index database is updated and the stored data database is updated to remove redundant data. In some embodiments, not all redundant data is removed in order to enhance recovery efficiency for data in stored data database.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for storing data comprising:
   receiving an input data stream comprising a plurality of data segments;
   preliminarily checking in a memory having a relatively low latency whether a duplicate of a segment of the plurality of data segments has been stored previously;
   in the event that the preliminary check does not conclusively determine whether the duplicate of the segment of the plurality of data segments has been stored previously, determining whether or not to check in a memory having a relatively high latency to conclusively determine whether a duplicate of the segment of the plurality of data segments has been previously stored in the relatively high latency memory, wherein the determination of whether to check is based at least in part on rate limiting access to the memory having the relatively high latency memory, and based at least in part on qualifying data, wherein qualifying data selects a subset of data segments for checking; and
   in the event that the determination is made not to check in the memory having a relatively high latency, storing the segment of the plurality of data segments in the relatively high latency memory without determining whether a duplicate of the segment of the plurality of data segments has been previously stored in the relatively high latency memory.

2. A method for storing data as recited in claim 1, wherein preliminary checking comprises checking in a cache.

3. A method for storing data as recited in claim 1, wherein preliminary checking comprises checking a summary.

4. A method for storing data as recited in claim 1, wherein preliminary checking comprise checking in a cache and checking a summary.

5. A method for storing data as recited in claim 1, wherein preliminary checking comprises checking in a cache and checking a summary and wherein limiting checking comprises qualifying data before checking the summary.

6. A method for storing data as recited in claim 1, wherein preliminary checking comprises checking in a cache and checking a summary and wherein limiting checking comprises qualifying data before checking the summary and wherein qualifying uses a deterministic function of the data segment.

7. A method for storing data as recited in claim 1, wherein preliminary checking comprises checking in a cache and checking a summary, and wherein the check is limited based at least in part on qualifying data before checking the summary, and wherein qualifying uses a deterministic function of the data segment ID.

8. A method for storing data as recited in claim 1, wherein preliminary checking comprises checking in a cache and checking a summary, and wherein the check is limited based at least in part on qualifying data before checking the summary, and wherein qualifying uses a hash function of the data segment.

9. A method for storing data as recited in claim 1, wherein preliminary checking comprises checking in a cache and checking a summary, and wherein the check is limited based at least in part on qualifying data before checking the summary, and wherein qualifying uses a hash function of the data segment ID.

10. A method for storing data as recited in claim 1, wherein preliminary checking comprises checking in a cache and checking a summary, and wherein rate limiting occurs if a count of accesses to the higher latency memory exceeds a threshold.

11. A method for storing data as recited in claim 1, wherein preliminary checking comprises checking in a cache and checking a summary, and wherein rate limiting occurs if a count of data segment requiring accesses to the higher latency memory exceeds a threshold.

12. A method for storing data as recited in claim 1, wherein preliminary checking comprises checking in a cache and checking a summary, and wherein rate limiting occurs if a count of bytes requiring accesses to the higher latency memory exceeds a threshold.

13. A method for storing data as recited in claim 1, wherein the low latency memory comprises a semiconductor memory.

14. A method for storing data as recited in claim 1, wherein the high latency memory comprises a disc drive.

15. A method for storing data as recited in claim 1, wherein the high latency memory comprises a tape drive.

16. A method for storing data as recited in claim 1, wherein the high latency memory comprises an optical drive.

17. A method for storing data as recited in claim 1, further comprising removing redundant stored data segments.

18. A method for storing data as recited in claim 1, wherein the plurality of data segments includes some segments which are duplicate data segments of prior sent data segments and wherein storing the data segment includes storing some, but not all of the duplicate data segments.

19. A method for storing data as recited in claim 1, wherein the plurality of data segments includes some segments which are duplicate data segments of prior sent data segments and wherein storing the data segment includes storing some, but not all of the duplicate data segments, further including determining data compression and performance requirement and determining a data storage duplicate allowance.

20. A device for storing data comprising:
a processor; and
a memory coupled with the processor, wherein the memory is configured to provide the processor with instructions which when executed cause the processor to:
receive an input data stream comprising a plurality of data segments;
preliminarily check in a memory having a relatively low latency whether a duplicate of a segment of the plurality of data segments has been stored previously;
in the event that the preliminary check does not conclusively determine whether the duplicate of the segment of the plurality of data segments has been stored previously, determine whether or not to check in a memory having a relatively high latency to conclusively determine whether a duplicate of the segment of the plurality of data segments has been previously stored in the relatively high latency memory, wherein the determination of whether to check is based at least in part on rate limiting access to the memory having the relatively high latency memory, and based at least in part on qualifying data, wherein qualifying data selects a subset of data segments for checking; and
in the event that the determination is made not to check in the memory having a relatively high latency, store the segment of the plurality of data segments in the relatively high latency memory without determining whether a duplicate of the segment of the plurality of data segments has been previously stored in the relatively high latency memory.

21. A device for storing data as recited in claim 20, wherein preliminary checking comprises checking in a cache.

22. A device for storing data as recited in claim 20, wherein preliminary checking comprises checking a summary.

23. A device for storing data as recited in claim 20, wherein preliminary checking comprises checking in a cache and checking a summary.

24. A device for storing data as recited in claim 20, wherein preliminary checking comprises checking in a cache and checking a summary, and wherein limiting checking comprises qualifying data before checking the summary.

25. A device for storing data as recited in claim 20, wherein preliminary checking comprises checking in a cache and checking a summary, and wherein limiting checking comprises qualifying data before checking the summary, and wherein qualifying uses a deterministic function of the data segment.

26. A device for storing data as recited in claim 20, wherein preliminary checking comprises checking in a cache and checking a summary, and wherein the check is limited based at least in part on qualifying data before checking the summary, and wherein qualifying uses a deterministic function of the data segment ID.

27. A device for storing data as recited in claim 20, wherein preliminary checking comprises checking in a cache and checking a summary, and wherein the check is limited based at least in part on qualifying data before checking the summary, and wherein qualifying uses a hash function of the data segment.

28. A device for storing data as recited in claim 20, wherein preliminary checking comprises checking in a cache and checking a summary, and wherein the check is limited based at least in part on qualifying data before checking the summary, and wherein qualifying uses a hash function of the data segment ID.

29. A device for storing data as recited in claim 20, wherein preliminary checking comprises checking in a cache and checking a summary, and wherein rate limiting occurs if a count of accesses to the higher latency memory exceeds a threshold.

30. A device for storing data as recited in claim 20, wherein preliminary checking comprises checking in a cache and checking a summary, and wherein rate limiting occurs if a count of data segment requiring accesses to the higher latency memory exceeds a threshold.

31. A device for storing data as recited in claim 20, wherein preliminary checking comprises checking in a cache and checking a summary, and wherein rate limiting occurs if a count of bytes requiring accesses to the higher latency memory exceeds a threshold.

32. A device for storing data as recited in claim 20, wherein the low latency memory comprises a semiconductor memory.

33. A device for storing data as recited in claim 20, wherein the high latency memory comprises a disc drive.

34. A device for storing data as recited in claim 20, wherein the high latency memory comprises a tape drive.

35. A device for storing data as recited in claim 20, wherein the high latency memory comprises an optical drive.

36. A device for storing data as recited in claim 20, wherein the memory is further configured to provide the processor with instructions which when executed cause the processor to remove redundant stored data segments.

37. A device for storing data as recited in claim 20, wherein the plurality of data segments includes some segments which are duplicate data segments of prior sent data segments and wherein storing the data segment includes storing some, but not all of the duplicate data segments.

38. A device for storing data as recited in claim 20, wherein the plurality of data segments includes some segments which are duplicate data segments of prior sent data segments and wherein storing the data segment includes storing some, but not all of the duplicate data segments, further including determining data compression and performance requirement and determining a data storage duplicate allowance.

39. A computer program product for storing data, the computer program product being embodied in a computer readable storage medium and comprising computer instructions for:

receiving an input data stream comprising a plurality of data segments;

preliminarily checking in a memory having a relatively low latency whether a duplicate of a segment of the plurality of data segments has been stored previously;

in the event that the preliminary check does not conclusively determine whether the duplicate of the segment of the plurality of data segments has been stored previously, determining whether or not to check in a memory having a relatively high latency to conclusively determine whether a duplicate of the segment of the plurality of data segments has been previously stored in the relatively high latency memory, wherein the determination of whether to check is based at least in part on rate limiting access to the memory having the relatively high latency memory, and based at least in part on qualifying data, wherein qualifying data selects a subset of data segments for checking; and in the event that the determination is made not to check in the memory having a relatively high latency, storing the segment of the plurality of data segments in the relatively high latency memory without determining whether a duplicate of the segment of the plurality of data segments has been previously stored in the relatively high latency memory.

* * * * *

UNITED STATES PATENT AND TRADEMARK OFFICE
CERTIFICATE OF CORRECTION

PATENT NO. : 7,631,144 B1
APPLICATION NO. : 10/940408
DATED : December 8, 2009
INVENTOR(S) : Zhu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 275 days.

Signed and Sealed this

Second Day of November, 2010

David J. Kappos
*Director of the United States Patent and Trademark Office*